FIG. I
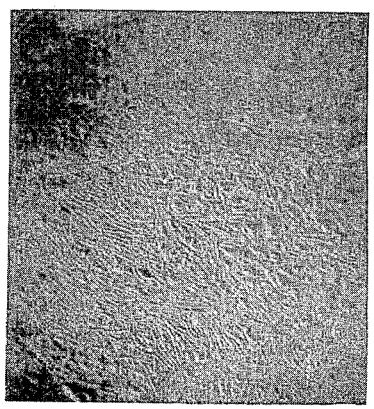
FIG. II
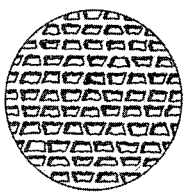
FIG. III
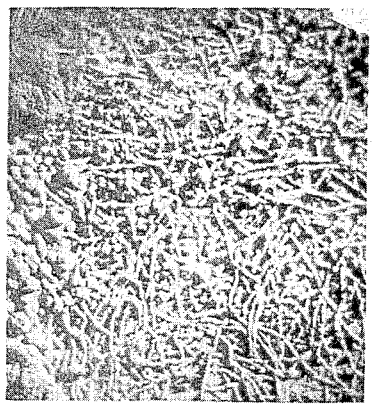

FIG. IV
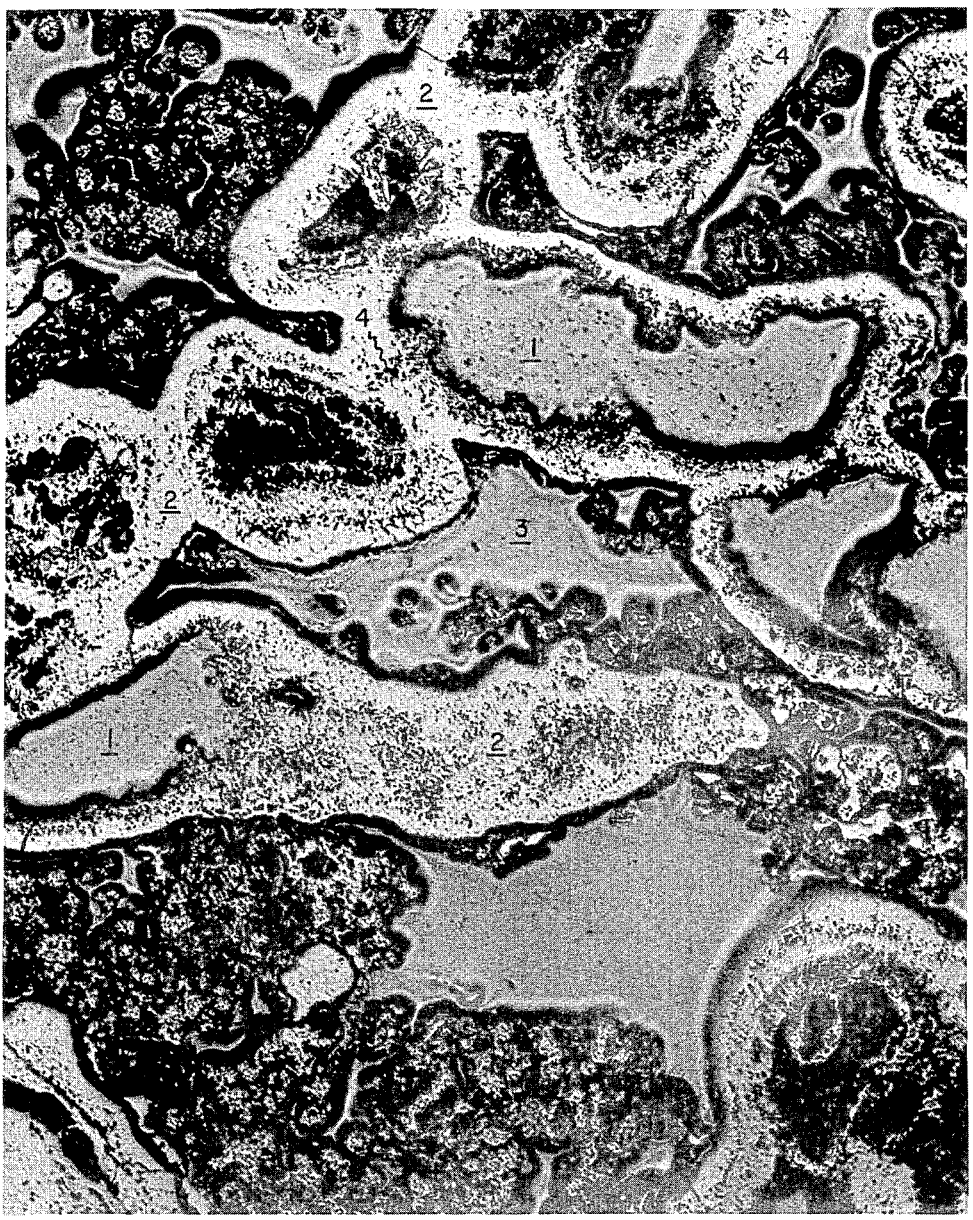
INVENTOR
HERBERT TALSMA
BY
ATTORNEY

FIG. V
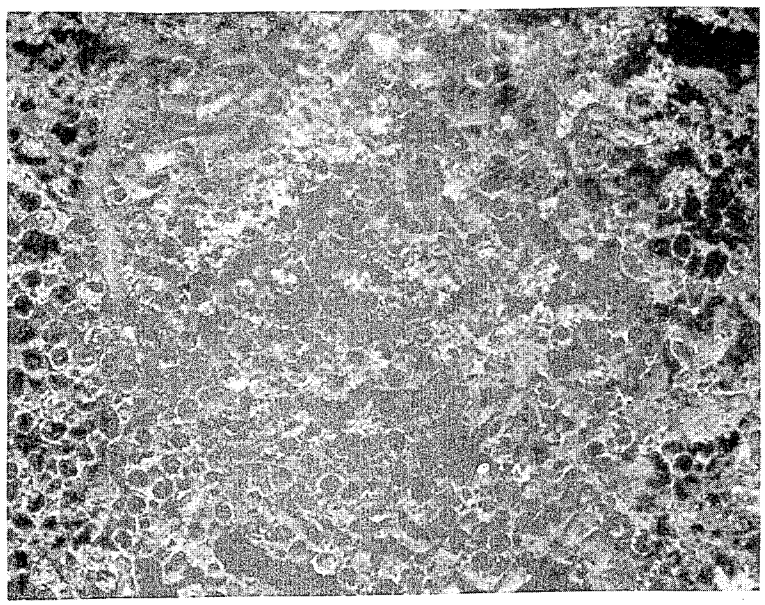
FIG. VI
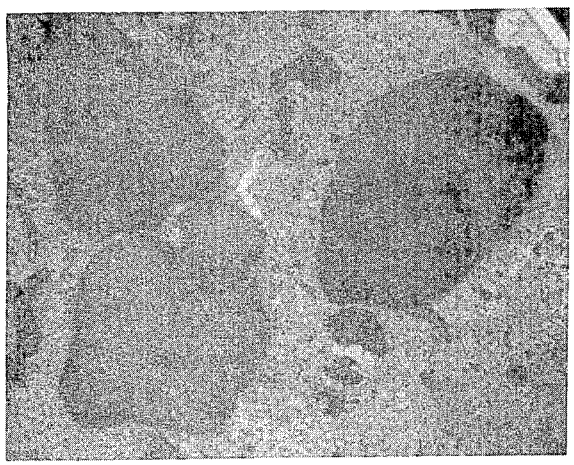
INVENTOR
HERBERT TALSMA

June 7, 1966  H. TALSMA  3,255,027
REFRACTORY PRODUCT AND PROCESS
Filed Sept. 7, 1962  4 Sheets-Sheet 4
FIG. VII
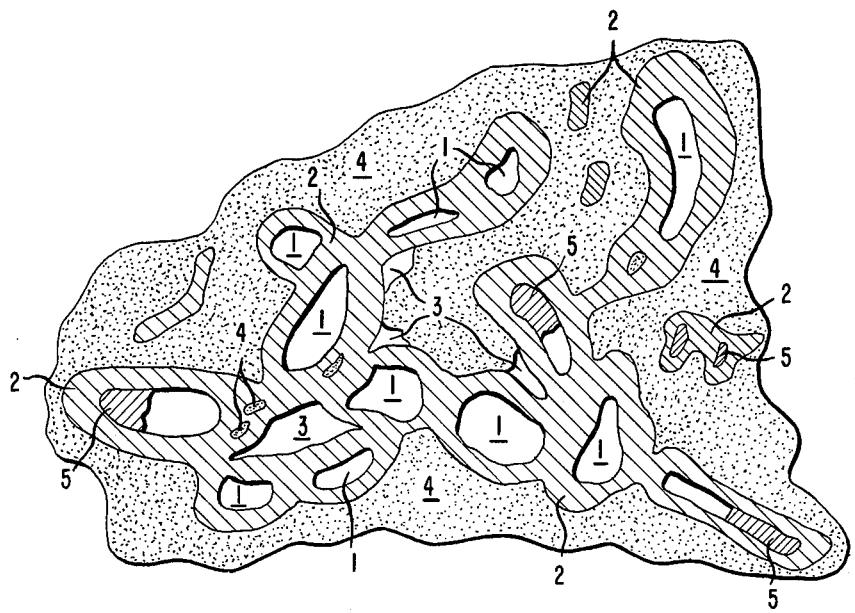
FIG. VIII
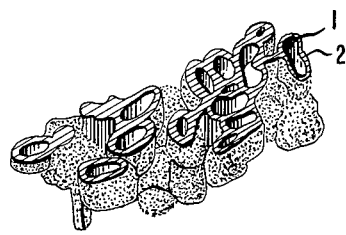
INVENTOR
HERBERT TALSMA
BY
ATTORNEY – # United States Patent Office 3,255,027
Patented June 7, 1966

3,255,027
REFRACTORY PRODUCT AND PROCESS
Herbert Talsma, West Chester, Pa., assignor to E. I. du Pont de Nemours and Company, Wilmington, Del., a corporation of Delaware
Filed Sept. 7, 1962, Ser. No. 222,238
13 Claims. (Cl. 106—65)

This application is a continuation-in-part of United States applications S.N. 82,053, filed July 11, 1961, S.N. 133,977, filed August 25, 1961 and S.N. 162,320, filed December 22, 1961, all now abandoned.

This invention relates to a novel and useful article of commerce and process for its production. More specifically it is concerned with a refractory product and a process for its production.

It is an object of the present invention to provide a shaped refractory product of high flexural strength, high resistance to thermal shock, high resistance to abrasion, having a controlled degree of porosity, the said refractory product being formable to any predetermined shape with a high degree of precision.

Another object is to provide a process for in situ oxidation of a preformed aggregate of contiguous aluminum particles, thereby forming a refractory product of the oxide of the said metal. Still a further object is the low temperature catalytic oxidation of aluminum particles to corundum.

These and other objects will become apparent in the course of the following specification and claims.

FIGURE I is a photomicrograph at a magnification of about four times of a ground surface of a structure of the present invention, more particularly identified in Example 1.

FIGURE II is a pen and ink representation of a fragmentation of an edge view of a honeycomb structure of the present invention, more particularly identified in Example 2.

FIGURE III is a photomicrograph at a magnification of about four times of the surface of a structure in Example 4.

FIGURE IV is a photograph at a magnification of about 270 times of a section of the brick of Example 6(C).

FIGURE V is a photomicrograph at a magnification of about 200 times of a section of a structure prepared substantially as that identified in Example 7 (Item f).

FIGURE VI is a photomicrograph at a magnification of about 36 times of a section of a structure prepared substantially as that identified in Example 10 (Item e).

FIGURE VII is a diagrammatic representation of a product formed in accordance with the present invention, more particularly identified below.

FIGURE VIII is a schematic representation of a skeletal structure formed in accordance with the present invention showing its three-dimensional nature.

The present invention provides a refractory body, characterized by a porosity of from about 15% to about 95% and comprising a skeletal structure of interconnected walls which define cells, said skeletal structure being characterized by a dense continuum of crystalline refractory constituted by a member of the class consisting of alpha alumina, compounds and solid solutions of alumina and at least one other oxide and solid solutions of at least one oxide in said compounds of alumina, the said skeletal structure containing at least about 30% by weight alumina, as determined by conventional chemical analysis. The refractory body is further characterized by an aluminum content of no greater than about 81% and an alumina content greater than about 19% by weight. When present, there is no more than about 81% of a filler refractory. The filler refractory material may be inert and exists in the product substantially in the same form as it was incorporated in the refractory body, or it may combine in whole or in part with aluminum oxide or its compounds with other oxides to form compounds or solid solutions.

In some instances the dense continuum of crystalline oxide is composed of small crystals averaging up to about 8 microns in diameter and having a density function, as described below, of at least 0.5. Generally, however, the crystals are so small as to be undetectable even at 750X magnification. Yet it is known that small crystals are present since there is discrete scattering of X-rays and continued heating of the product brings crystal growth to the point where crystals are visible at the high magnifications. Where the skeletal structure is part of a refractory body including other constituents, the interconnected walls occupy at least about 19% of the area (exclusive of pores) of a random plane cut through the body.

The continuous "integral skeleton" containing refractories differ in kind from the non-skeletal products due to their very high thermal shock resistance, high flexural strength and high abrasion resistance. The skeletal structures provide refractories having flexural strengths (corrected to zero porosity) of at least 500 p.s.i. at 25° and 1550° C. Such objects have high abrasion resistance and are not cracked or eroded upon sudden exposure of the room temperature structure to a 1500° C. flame.

The preferred refractory bodies are substantially free of siliceous compounds. It has been found that the refractory products of the invention which contain siliceous compounds are considerably different from those in which such compounds are absent or present only as an impurity. The latter have a higher melting point than the former and due to the difference in chemical reactivity, the utilities of the products would be different. Accordingly, each of these species will be considered separately in the body of the specification.

The products of the invention are formed by a process which comprises intimately mixing particles of aluminum, and alloys in which the aluminum constitutes the predominant component, with at least about 0.02% by weight based on said particles, of a metal oxide fluxing agent from the class consisting of the alkali metals, the alkaline earth metals, vanadium, chromium, molybdenum, tungsten, copper, silver, zinc, antimony, and bismuth oxides, precursors of said oxides yielding the indicated amount of fluxing agent, and alkali metal hydroxides, and from zero to about 8 parts by weight of a particulate filler refractory per part of aluminum. The mixture is adinant component, with at least about 0.02% by weight rials of at least about 20% and thereafter the aluminum in the said mixture is oxidized at a temperature of at least about 400° C.

There are several conditions which must be met before the skeletal structure referred to above is obtained. To begin with, there must be a sufficient proportion of metal in the green mix, i.e., unfired mix, to provide the skeleton when the metal is in its converted form. In addition, the metal particles must meet certain size requirements. Lastly, the firing conditions must be carefully controlled. To prepare the skeletal structures, it has been found that at least about 11% by weight of aluminum based on the green structure exclusive of volatile material is required and that said particles must have one dimension of between about 0.5 and 200 mils, and a second and third dimension of at least about 0.5 and 7 mils respectively. The green body is fired by heating at a temperature of at least 400° C. in an oxygen-containing atmosphere, at such a rate that the temperature of the shaped green body does not exceed the ambient temperature by more than 200° C. until at least 11% by weight of aluminum, based on the weight of the green body exclusive of volatile material, is oxidized to form the substantially continuous integral skeleton. This generally is observed to occur when sufficient oxygen has been added to the structure to increase the weight of the green structure by at least about 11%.

The minimum amount of aluminum which may be used in the preparation of the structures of the invention is in part dependent upon the size distribution of metal particles and on the presence or absence of reactive metal oxides. For example, where MgO or other reactive oxide is present and aluminum particles of about 15-mil average diameter, are employed, the minimum aluminum content can be about 11% where reaction temperatures are attained. On the other hand, with alumina, silicon carbide or other non-reactive filler refractory, at least about 20% of aluminum particles of the same size must be employed. In both cases, greater amounts of aluminum, e.g., 14 and 24% respectively are required where larger particles, i.e., about 50-mil diameter, are used.

By "crystalline refractory" is meant that the oxide of the structure will diffract X-rays in a discrete manner, i.e., it is a nonglassy material. Generally it is preferred that no more than a minor amount of such glassy material, i.e., no more than about 10% by weight, be present in the final structure. By a "filler refractory" is meant a melt resistant carbide, nitride, boride or oxide as more particularly identified below which is present in either the green or the fired structure and is not oxidizable under the conditions of the firing operation.

Porosity of the green structure is essential to permit penetration of the oxygen-bearing gases into its interior. In some instances as where silicates are present as part of the filler refractory component, it has been found that oxygen is supplied to the metal particles at least in part by the reduction of neighboring oxide material. By a "precursor of the oxide" is meant a material which under the firing conditions produces the oxide.

Granular and non-granular metal shapes may be employed, e.g., funicular, acicular or pellicular, which may be derived from structures such as a filament, continuous fiber, staple, yarn, hair, floc, sliver, shred, shaving, splinter, paring, film, foil, ribbon or the like.

The structure formed is represented diagrammatically in FIGURE VII. As will be seen from the figure, voids 1, corresponding substantially in shape to the shape of the original aluminum particles, are formed. The spaces between the voids, which correspond roughly to the spaces between the metal particles in the green structure, have become substantially filled with metallic oxide formed in situ 2. Pores 3, which are spaces between the metal particles in the green structure not filled by metallic oxide formed in situ, also exist in the final structure. Some filler refractory 4 is dispersed in oxide 2 and substantial amounts are not encased by skeletal structure. At times an unoxidized fragment of aluminum 5 can be found, particularly when the oxidation in the firing stage is not complete. Similar structures are shown photographically at different magnifications in FIGURES IV and V. The various parts are labelled in FIGURE IV to correspond to those identified in FIGURE VII discussed above. In FIGURE IV the voids contain plastic filler due to the technique employed in polishing samples for photographic purposes at this magnification. Optical properties of the materials create a well defined optical boundary between the plastic and the solids of the refractory body. While applicant does not wish to be bound by any particular theory, it is believed that mutual molecular intradistribution of in situ formed metal oxides results to form the continuum during the formation and expansion of the in situ formed oxide. The final structure is characterized by a porosity of between about 15% and about 95%.

The interconnected walls or elements that constitute the skeleton define or enclose cells or pores. The average size of the cells or pores is determined by the size of the metal particles used in the process. These particles are partially or completely converted to the oxide in the form of a shell or wall surrounding the void left by the original metal particle. The wall or shell defines a cell which corresponds in shape and size to the original metal particle. The cells may be empty or contain some unoxidized aluminum. These pores are to be distinguished from pores existing in the refractory body but outside of the skeletal structure which arise from removal of volatiles or which existed in the green body. The pores within the skelton (exclusive of micropores, below 0.5 mil) when measured in a plane cut through a body have an average diameter of between about 0.5 and 200 mils. Preferably, the pore size will range between about 2 and 40 mils. These pores have the appearance of closed cells. The walls surrounding the pores of the skeleton have a minimum thickness of about 0.3 mil and are substantially homogeneous for at least this width. By "substantially homogeneous" is meant that the wall is free of occlusions of non-skeletal material or voids greater than about 0.1 mil in diameter for the minimum thickness. In general, the aluminum particles which are oxidized in situ are located a sufficient distance apart to permit wall formation of at least the minimum thickness between the voids formed from the metal. However, where two or more metal particles in the green mix are so close that a 0.3 mil wall cannot form between the voids, the wall referred to above is that surrounding the combination of voids.

The maximum thickness of the wall surounding a pore within the skeleton will be about the diameter of the enclosed pore. However, the walls of two adjacent pores may integrate to give a double wall thickness between them. The walls may appear thicker in a particular planar section, however, since the structure is three-dimensional, the thickness of a wall can best be determined from a section cut perpendicular to the major axis of the cell.

The skeletal grains have a density function (i.e., an average ratio of perimeter in contact with other grains to the total perimeter under consideration) of from between about 0.5 and 1.0. Structures of this type are exemplified in the examples.

When the granular metal shapes are employed that are smaller than the dimensions outlined above, a refractory is formed which does not possess the "integral skeleton" described above. Similarly, no "integral skeleton" is formed where the metal concentration in the green structure is below 11% by weight of the green body exclusive of volatile constituents.

An amount of unoxidized metal may remain in the final structure. However, residual metal may be melted out of the refractory where porosity permits. In addition, after treatments may be used such as firing at high temperature to fuse, filler refractories together where internal structure permits.

The final form which the refractory is to take is readily shaped from the green mix. Thus, crucible, cones, catalyst supports, tube sections, motor casings, bearings, abrasion wheels, bricks, insulating panels and the like, can be fabricated from random or ordered arrangements of metal. Laminates, honeycombs and other bodies having repeating patterns, particularly where corrugations permit access of an oxidizing atmosphere between adjacent layers, may be readily formed into structures, having excellent insulation and mechanical properties.

In the following examples, porosities are calculated from the apparent density (weight of the body in air/mass volume of the body including opened and closed pores), and the density of the solid material as obtained by crushing the sample and determining the volume of the solids and their weight. The volume measurement is conveniently made on an air comparison pycnometer (model 930, made by Beckman Instruments, Inc., of Fullerton, California). As an approximation, the porosity may be calculated from the apparent density and the calculated density of the solid material in a body of known composition. All sieve measurements are made with U.S. Sieve Series.

Flexural strength is measured according to ASTM Standard 1958, Part 4, page 670, Text No. C293–57T with the use of a span width of 1 to 4 inches.

For better comparison of products, the flexural strengths are corrected for porosity of the sample by the expression $$\frac{\text{Flexural strength (as measured)} \times 100}{100 - \text{percent porosity}}$$

Porosity actually causes a much greater decrease in strength than this correction implies.

The hot load subsidence is measured according to ASTM C16 schedule 7, modified to use a cylindrical sample 2¼ inches in diameter by 2 inches thick.

The abrasion resistance test is performed by pushing a ½ inch by ½ inch sample along a 6-inch hard steel bastard file by hand under a force of about 3 pounds for 8 strokes. The weight loss by abrasion is reported.

Grain size is determined by the following procedure:
The sample is mounted by placing the sample covered with sealing wax in a cold oven and then raising the temperature to about 150° C. under vacuum. The sample is then rough polished using silicon carbide papers of 80, 120, 240, 400, and 600 grit in that order. The sample is then polished using Elgin 6 and 1 Dymo diamond abrasive (made by the Elgin Watch Company of Elgin, Illinois) on rough and fine pellon lap (made by Groscience Instrument Corporation, located at 142 Maiden Lane, New York, New York) on a convenient polishing wheel.

The wax is removed from the polished sample by melting most of it and burning the remainder in a Meker burner gas flame.

The sample is immersed in boiling concentrated phosphoric acid ($H_3PO_4$) for about 5 to 30 seconds after which it is rinsed in water, fired and examined under a Bausch and Lomb Research Metallograph (model 42–31–36–50 made by Bausch and Lomb Inc., of Rochester, New York). The sample is returned to the phosphoric acid bath for more etching for increasingly shorter etching exposure times.

Cell (or pore) size is determined by the lineal analysis of microstructure technique as discussed by W. D. Kingery in "Introduction to Ceramics," pages 412–417 (published by John Wiley and Sons, Inc., New York, 1960). The individual cells of products of this invention may have diameters varying from 1 to 5000 microns depending upon the shape of the aluminum used in the process and the compaction of the green body. However, the larger cells with a diameter of from 50 to 5000 microns form the substantial portion of the total porosity.

The skeletons of the examples of this invention show very few, if any, grain boundaries after etching and examination under the metallograph at 750X magnification. X-ray measurements indicate a general grain size of less than 1 micron and 5 to 10% of the grains being between 1 and 5 microns in size. Examination of conventionally formed articles of dense polycrystalline alumina shows discrete grain boundaries after etching with an average grain size of 20 or more microns.

As stated earlier, the skeletal structure is a dense continuum of the oxides, that extends throughout the three dimensions of the refractory body. It is substantially continuous and integral. It can readily be distinguished from other material in the body by its dense nature and small crystal size, as well as by its chemical constitution.

The continuity of the skeletal structure can be shown by treating the refractory with a chemical that is relatively inert to the skeletal phase but which will dissolve or destroy any other phases. An integral structure of substantially all the skeletal material remains. A more simple procedure is to observe the skeletal and other material in enlarged photographs of cuts through the body. To obtain a true representation of the structure, the sections selected for examination should be of cuts made well within the body, e.g., at a depth of at least about 20% of any external dimension of the body. In general, the skeletal structure is obvious from the fact that the dense continuum referred to above extends throughout the section observed and constitutes at least about 19% of the area of the solid material of the section. However, in the instance where amounts of aluminum around the lower limit are employed, the dense skeletal structure may appear slightly discontinuous in a planar section. In the event, establishment of skeletal structure continuity involves the examination of successive parallel sections obtained by cutting or polishing the body.

The chemical constitution of the skeleton can be determined by conventional analysis or quantitative X-ray diffraction methods.

The following "density function" may be used as a measure of the density of the skeletal structure:

$$\text{Density function} = \text{average}\left[\frac{\text{part of perimeter in contact with other grains}}{\text{total perimeter of grain under consideration}}\right]$$

Products of this invention show values of the above between 0.5 and 1.0 while products of the prior art have values of lower than 0.5.

The density function is determined for each grain by examining a photomicrograph of a polished section of the sample and the results are averaged. Most products of this invention, as made, show no visible grain boundaries after etching and viewing at 750X magnification. In this event the value of the density function approaches an upper limit of 1.0. Grain growth can occur with prolonged heating at, for example, 100 hours at 1600° C. to afford an average grain size of about 8 microns. Further grain growth is limited by the thickness of the skeleton and the value of the density function aproaches the lower limit of 0.5.

Typical commercial insulating fire bricks (Ipsen 3400 and Alundum L) have density functions of 0.08 and 0.05, respectively. A typical product of this invention after heating 50 hours at 1700° C. has a density function of 0.74.

Thermal shock resistance is measured by mounting the samples along the periphery of 1.5-foot diameter horizontal turn table, which is rotated at about 4 revolutions per hour. Three glass-blowing torches are mounted outside the turn table at 120° separation from the table axis so that each natural gas/oxygen flame impinges on a sample. Samples are retained on the turn table with intermittent heating and cooling (12 cycles/hour) until a cold sample breaks when tapped gently with a teasing needle.

The warping or differential changes in a dimension from one location on a bar to another is determined by measuring the thickness (T) along the width of a bar at the edge and center of a cut section. Percent warping is calculated from the lesser thickness (T1) and the greater thickness (Tg) as follows:

$$\% \text{ warping} = \frac{Tg - T1}{T1} \times 100$$

As mentioned previously, those refractory bodies containing siliceous constituents in amounts up to about 50% by weight, calculated as silica are quite different in chemical and physical properties from those bodies where the siliceous material is absent or present merely as a slight impurity. Greater amounts will ordinarily not be employed since the properties are too adversely affected. The siliceous constituent may be elemental silicon, silica or metal silicate. It may appear as part of the skeletal structure or as an inert filler. Preferably at least about 25% by weight of aluminum particles should be used for the green mix in performing this embodiment of the invention. The products are much weaker than the non-siliceous material-containing bodies with regard to thermal properties although the preferred products possess an impact strength of at least about 4 foot pound/in.²

The siliceous constituent includes all manner of substances which contain silica or silicic acid based on chemical analyses. Thus, pure metal silicates as sodium meta silicate, lead silicate, magnesium ortho silicate may be used.

Various clays such as kaolin, ball clay, and the many fire clays are satisfactory. The expression "clay" is used in the broad sense of a naturally occurring substance with a composition corresponding to that of an aluminosilicic acid, usually mixed with sand and other materials which becomes plastic when mixed with the proper amount of water. Burnt clays (i.e., grog) may be used.

Minerals containing magnesium and silicon, such as asbestos (e.g., chrysotile, $3MgO \cdot 2SiO_2 \cdot 2H_2O$, amosite, anthophyllite, crocidolite, tremolite and synthetic amphiboles); talc, steatite or soapstone (e.g., $$3MgO \cdot 4SiO_2 \cdot 1H_2O$$

forsterite ($2MgO \cdot SiO_2$); and vermiculite (e.g., $$6MgO \cdot 8SiO_2 \cdot 10H_2O$$

are satisfactory.

For reasons of economy, mineral substances are preferred. Preferably these substances should have a melting (or softening) point above about 700° C. They may lose water and their mineralogical form at substantially lower temperatures but they should not flow. Magnesium and/or alumina silicates are preferred siliceous compounds.

Certain clays may contain sufficient alkali metal oxides to serve as a flux. However, it has been found that about 3.0% (based on clay) of an alkali metal oxide must be present in (or added to) a clay to be effective as a flux at temperatures of about 1000° C. This is surprising when the presence of as little as 0.02% (based on metal) of an alkali metal oxide in a non-clay system is effective. It is believed that the clay can chemically bind the oxide and restrict its use in the process.

In firing the siliceous material containing green bodies, temperatures between 700° C. and the melting point of the siliceous compound are employed.

Certain refractory products of the invention may be viewed as crystalline refractories characterized by a porosity of from about 15% to 95% and comprising a rigid aggregate of metal oxide shapes having at least one minor dimension the said oxide shape being a member of the class consisting of (A) the oxide formed by the in situ oxidation with gaseous oxygen of a metal of the class consisting of aluminum, and alloys thereof in which aluminum constitutes the predominant component and (B) a composite of (A) and the oxide of a different metal which is a member of the class consisting of the alkali metals, the alkaline earth metals, vanadium, chromium, molybdenum, tungsten, copper, silver, zinc, antimony, and bismuth, the said composite containing at least about 30% by weight of the said oxide formed in situ and from about 0.02% to about 20% by weight of the said oxide of a different metal, the said crystalline refractory being further characterized by a residue metal content from the formation of (A) of no greater than about 81% and, when present, no more than 81% of a filler refractory, the said filler being particulate, crystalline and substantially unfused.

The minor dimension referred to above lies between 0.5 and 200 mils.

The previous discussion has been concerned primarily with skeletal structures that are cell walls or shells which are interconnected. The discrete elements, namely, the cell walls or shells are also new and useful structures. Such a discrete element is made by oxidizing an aluminum particle (of the same size as previously discussed) with a fluxing agent so that it does not fuse to or become an integral part with another element. This is conveniently done by reacting aluminum particles (and flux) in a refractory diluent such as powdered magnesia, alumina or the like and separating the particles from the diluent. The concentration of the aluminum must be less than that required to give a skeletal structure under the firing conditions used as previously discussed. The firing temperature must be below that causing an appreciable amount of bonding of the diluent in order that the discrete particles can be recovered. Alternatively, the particle may be oxidized singly as by hanging a 5-mil diameter filament coated with sodium silicate in a furnace and heating the same at 850° C. for four hours.

The fully converted discrete particles are hollow with an interior void or cell corresponding in shape and size to the original metal. The wall is composed of a dense (density function of 0.5 to 1.0) crystalling continuum of fine grain alpha alumina, a compound containing alumina and another oxide or solid solution of an oxide in the above. The wall has a thickness of between about 0.3 mil and the diameter of the enclosed pore or cell. Particles of the diluent used may be occluded within the wall. The shape of the particle will correspond roughly to the shape of the starting material. Using spheres of aluminum the discrete products will be approximately spherical in shape with a diameter of between about 10 and 300 mls. When using elongated forms as fiber and foil, the length is preferably less than 2 or 3 inches.

The particles are strong and have a high resistance to crushing so that they can be used as a loose insulating fill, or as reinforcements for plastics, glasses, metals, etc.

The discrete particles containing up to about 81% preferably between 5 and 83%, residual aluminum in the central void, e.g., at least about 11% conversion of aluminum, or as small (about 1 micron or less) inclusions in the wall itself are particularly useful. An aggregation of such particles can be fired in air to yield the skeleton products of this invention. This firing process is much less critical than that used for making skeletal products directly from aluminum particles since the occurrence of a disruptive exotherm or the exudation of aluminum is not likely to occur. Thus mixtures containing such particles, temporary binders, and filler refractories as desired are useful for ramming mixtures, refractory castables, and molding mixtures for all types of products.

The following examples are presented to illustrate the invention and they are not to be construed as limitative.

EXAMPLE 1

A melt of aluminum (AEC grade, 99.995% pure) heated to a temperature between 725 and 750° C. in an alumina pot under an atmosphere of argon is extruded through a one-hole alumina spinneret and the continuous filament, having an average diameter of about 0.005 inch, is collected in a loose batt. This filament is ductile, having an elongation at the break of between 5 and 35%.

Seventy-four grams of the filaments so prepared are hand-pressed into a mold 3 x 6 x 2 inches, the bottom of which is perforated with ³⁄₃₂-inch holes. The resulting loose batt is then thoroughly wetted with a saturated solution (25° C.) of fluxing agent identified in Table I. (In each case the percentage of fluxing agent is based on the total dry weight of the batt.) The wet batt is then compressed under an 8000 pound load (about 410 p.s.i.), thereby removing excess solution. The compressed batt (3 x 6 x 0.41 inches) is removed from the mold, wiped dry and dried in a vacuum oven at 150° C. for 16 hours.

*Table I*

| Fluxing Agent: | Percent Agent (based on total dried wt.) |
|---|---|
| (a) $SiO_2/Na_2O=3.25$ (ortho) | 29.5 |
| (b) $Na_2CO_3$ | 21.4 |
| (c) $Na_2B_4O_7 \cdot 10H_2O$ (Borax) | 22 |
| (d) $Na_2HPO_4$ | 36 |

The dry batt is then placed in an electrically heated muffle furnace at 150° C. with an air atmosphere. The temperature is raised from room temperature to 600° C. over a period of about 4 hours, kept at 600° C. for 48 hours, raised to 1000° C. over a period of 2 hours and heated at 1000° C. for 1 hour.

The cooled structure of each run has some globules of metallic aluminum adhering to it which are removed by hand picking and melting (usual total of about 1 gram). The plate is about 6.02 x 3.13 x 0.45 inches, is dark gray, has the appearance of a solid ceramic, is opaque to light, hard and is permeable to air. The original fiber structure is visible on the surface. The plate of (a) has a hardness of approximately 12 on the modified moh scale, weighs 177 grams (1.31 gram/cm.$^3$ bulk density or 81.6 pounds per cubic foot) and has a flexural strength of 1220 pounds per square inch (or 3720 per square inch when correction is made for density). The density of the solid phase is 3.4 gram/cm.$^3$ so that the plate contains 61.5% by volume of voids. Exposure of any of the plates to a natural gas/oxygen flame (approximately 2400° C.) for 1 minute causes no cracking or any other visible effects, demonstrating excellent resistance to thermal shock. A commercial sample (¼ inch thick) of an electrically fused aluminum oxide cracks in two when exposed to such a flame. The bulk densities and flexural strengths (both "normal" and "density corrected") in pounds per square inch are reported in Table II for those samples upon which these properties are measured.

Table II

| | Bulk Density (g./cm.$^3$) | Flexural Strength (p.s.i.) | |
|---|---|---|---|
| | | Normal | Porosity Corrected |
| (b) | 1.14 | 1,200 | 4,210 |
| (c) | 0.83 | 470 | 2,260 |
| (d) | 1.22 | 1,670 | 5,480 |

Each of the plates is unaffected by boiling water, 50% aqueous NaOH, and concentrated H$_2$SO$_4$, while exposure to 50% aqueous HF at 100° C. for 2 hours extracts only 5% of the original weight, the residue being still strong and useful.

X-ray diffraction patterns of the product formed by (a) show a strong pattern for alpha alumina, the presence of some aluminum nitride and the absence of any aluminum. A crystalline silicon pattern is observed.

When the process is modified by a four-hour heating at 600° C. instead of a forty-eight hour heating at this temperature less complete oxidation occurs and the product has a (.7 to .9 gm./cm.$^3$) lower bulk density. When the surface is ground (a diamond or garnet wheel required) it is noted that the fibers are hollow. A photomicrograph of the ground surface at a magnification of about four times is shown in FIGURE I.

By varying the amount of compression and hence the density of the wet batt, plates are obtained having bulk densities of from about 0.2 to 3.5 gram/cm.$^3$.

Omission of the fluxing agent in the above process results only in a very thin layer of oxide on the metal with no bonding between particles.

Using fluxing agent (a) and following the procedural technique employed as taught above (with a 600° C. heating period of 48 hours), various types of non-pellicular aluminum forms are employed to form products of the present invention. The shapes are identified in Table III and the measured properties in Table IV.

Table III

| | Aluminum Form | Particle Dimensions (mils) | Amt. Used (grams) |
|---|---|---|---|
| (e) | Wool, soft, fine | $^1$ 4 x 10 | 74 |
| (f) | Wool, coarse | $^2$ 5 x 30 | 70 |
| (g) | Filaments (½%Si) | $^2$ 5 | 48 |
| (h) | Filaments, commercial (Alloy No. 1100) | $^2$ 6.4 | 50 |
| (i) | ⅛" staple commercial (Alloy No. 6061) | 1 x ca 15 | 35 |
| (j) $^3$ | Carpet tacks, ½" | ($^4$) | ($^4$) |

$^1$ Cross-sectional dimension.
$^2$ Diameter.
$^3$ Cylindrical mold 2½" diameter, ⅜" deep is stuffed full. Final structure weighs 20 grams. 32 grams of Al melts out.
$^4$ Not determined.

Each structure has an excellent thermal shock resistance although (g) shows a decrease in strength after the thermal shock test.

Table IV

| | Bulk Density g./cm.$^3$ | Flexural Strength (p.s.i.) | |
|---|---|---|---|
| | | Normal | Density Corrected |
| (e) | 1.30 | 1,200 | 3,700 |
| (f) | 1.47 | 1,000 | 2,725 |
| (g) | 0.98 | 1,610 | 6,310 |
| (h) | 1.19 | 1,480 | 4,980 |
| (i) | 1.13 | 1,750 | 6,200 |
| (j) | 0.55 | ($^1$) | ($^1$) |

$^1$ Not measured.

Satisfactory products are also obtained when the sodium ortho silicate is diluted 1:1 with water (less than 15% of agent in composite). When using less concentrated solutions, the addition of a thickening agent is helpful to assure uniform coatings and retention of the fluxing agent on the metal.

EXAMPLE 2

(a) A laminate with alternating layers of aluminum foil and sodium silicate (applied as a concentrated aqueous slurry) is formed from 100 six-inch strips (71.4 grams) of 0.001 x 3-inch aluminum foil. It is placed in the 3 x 6 x 2-inch mold described in Example 1, subjected to a pressure of 410 pounds per square inch and heated at 150° C. for 48 hours while still in the mold. After drying under vacuum for 16 hrs., the structure is heated for 4 hours at 600° C. and 2 hours at 1000° C. as in Example 1. A strong sheet having a bulk density of 1.92 grams/cm.$^3$ and excellent thermal shock resistance results. Although the aluminum is not completely oxidized under these conditions, metallic aluminum does not melt out due to the nature of the structure.

(b) Another structure formed in the same mold in the manner taught above from 27 sheets (116) grams of aluminum with cross sectional dimensions of 0.006 x 3 inches, has a bulk density of 2.71 grams/cm.$^3$.

(c) Commercial aluminum foil of 0.006-inch thickness is crimped by passing it between two intermeshing rolls each 3" in diameter and bearing 144 teeth on its surface. The crimped product in side view has the appearance of alternating equilateral triangles having an altitude of about 30 mils. The crimped foil is coated on both sides with the sodium silicate solutuion of (a) above and then about 25 alternate layers of the crimped foil and the uncrimped foil are placed together. There is sufficient adhesion due to the fluxing agent to hold the composite. The composite is dried in 150° C. vacuum oven and is then fired at 600° C. for about 48 hours and then for an additional 1 hour at 900° C. The oxidation is complete and no aluminum melts out of the product.

The final product, the edge of which is illustrated in FIGURE II, has a bulk density of 1.23 gram/cm.$^3$, has a flexural strength (density corrected) of 11,000 p.s.i. transverse to the laminai. It has excellent thermal shock resistance and has the further advantage that prolonged exposure to a 2400° C. flame results only in the melting or corroding of a hole in the top layer of the laminate so that this structure provides an excellent flame-proof barrier.

EXAMPLE 3

A loose batt of the aluminum fibers of items (a) through (h) of Example 1 is hand-pressed around a large crucible to form a preform of the fibers in the shape of a crucible having a bulk density of about 0.38 gram/cm.$^3$. This is dipped into the sodium silicate solution of item (a) of Example 1, the excess wiped clear and the composite structure dried. It is then fired as in Example 1 to obtain a coherent strong structure having a bulk density of 0.72 gram/cm.$^3$ which is so porous that it transmits light.

EXAMPLE 4

Aluminum fibers of items (a) through (h) of Example 1 are molded under 170 p.s.i. to give a wafer weighing 5.64 grams, 2¼″ in diameter and ⅛″ thick. The wafer is saturated with the sodium silicate solution of item (a) of Example 1, diluted with 1 part of water and dried at 150° C. in a vacuum oven. The dried wafer is heated in a 600° C. oven under an air atmosphere for 16 hours followed by a 30-minute treatment at 650° C. The wafer is removed from the oven, cooled, weighed (6.20 grams) and then reheated at 650° C. for 1 hour and then the temperature raised to 700° C. and an atmosphere consisting of oxygen/argon, 40%/60% by volume is passed through the oven for 1 hour followed by a 1-hour treatment at 800° C. under the same atmosphere and then a subsequent 20-minute treatment at 850° C. under the same atmosphere. The cooled wafer weighs 7.53 grams. A few small globules of aluminum (0.26 gram) are removed. The wafer is then refired at 950° C. for 1 hour. After this firing it weighs 9.33 grams. The wafer is then refired for 16 hours at 950° C. to give a final product weighing 9.41 grams. Based on the weight of aluminum remaining in the structure, the oxidation has proceeded to 73% of theoretical. The sodium silicate used, based on the weight of the metal remaining in the structure, is 9.9% of the aluminum or 0.014 mol of the fluxing agent per mol of the metal. The product is strong and has excellent thermal shock resistance to a 2400° C. flame. A photomicrograph of the surface of the structure, magnified about four times, is shown in FIGURE III. Globules of unremoved aluminum are visible along the edges of the photograph.

EXAMPLE 5

Approximately 2.5 grams of aluminum fibers (as employed in Example 1a, except in items f, g, and k wherein commercial aluminum staple is used containing 1.2% manganese, is mixed with a water solution or slurry of the fluxing agent identified in Table V and the wet mass molded into a 1⅛″ diameter wafer under about 410 pounds per square inch. The wet wafers are placed on a clay plate and dried in air in an electrically heated oven at temperatures noted below, for the periods indicated.

Items b, d, j and m:
    260° C. for 16 hrs., then
    625° C. for 16 hrs., then
    850° C. for 18½ hrs.

Items c, e, h, i and l:
    600° C. for 2 hrs., then
    860° C. for 12 hrs., then (for c and h only)
    1000° C. for 16 hrs.

Items f and g:
    270° C. for 17 hrs., then
    600° C. for 24 hrs., then
    850° C. for 30 hrs., then
    1000° C. for 16 hrs.

Items a and k:
    600° C. for 16 hrs., then
    860° C. for 16 hrs.

Table V reports the amount of fluxing agent (dry basis) on each item determined by weighing after heating periods below 800° C.) and the percentage weight gain based on the theoretically possible gain after the high temperature (i.e., above 800° C.) cycles. It will be noted that a second high temperature cycle was applied only to items c, f, g, and h. Control runs (i.e., no fluxing agents) of the pure aluminum items disclose no weight gains on heating at 850° C. A control of the commercial staple (1.2% manganese) discloses a weight gain of 6% of that theoretically possible after 30 hours at 850° C. and 32.5% after 16 hours at 1000° C. Each control structure was crumbly with little strength.

Melting points are determined on the wafers after the final heat cycle by applying a natural gas-oxygen flame to the surface and estimating the temperature with an optical pyrometer. The samples do not crack or erode during the exposure to the flame showing the excellent thermal shock properties of these products.

*Table V*

| Item | Fluxing Agent | Weight Flux [1] (Percent) | Flux [2] | Weight gain [3] (Percent) High. Temp. 1st | Weight gain [3] (Percent) High. Temp. 2d | Melt. Point, °C. | Crush. Strength (p.s.i.) |
|---|---|---|---|---|---|---|---|
| a | LiOH [4] | 18.3 | 25.6 | 79 | | 1,875 | 1,000 |
| b | Na$_2$O$_2$ [4] | 14 | 5.7 | 67 | | 1,650 | 500 |
| c | KOH | 13 | 7.1 | −1 | 49 | 1,560 | 1,380 |
| d | Ca(OH)$_2$ | 30 | 15.8 | 62 | | 1,660 | 900 |
| e | Sb$_2$O$_3$ | 40 | 6.2 | 62 | | 1,475 | 520 |
| f | Bi(NO$_3$)$_2$ [5] | 3 | 0.19 | 76 | 83 | 1,925 | 450 |
| g | Na$_2$B$_4$O$_7$ | 14 | 2.2 | 26 | 95 | 1,850 | 850 |
| h | NaAlO$_2$ | 54 | 31.4 | 70 | 72 | 1,775 | 440 |
| i | Na$_2$CO$_3$ | 13 | 3.6 | 43 | | 1,750 | 1,300 |
| j | Na$_2$SiO$_3$ | 29.8 | 9.4 | 60 | | 1,430 | 1,400 |
| k | PbSiO$_3$ | 76 | 30.0 | | | 2,020 | 11,000 |
| l | Na$_2$SnO$_3$ | 11 | 1.97 | 76 | | 1,775 | 800 |
| m | Na$_2$HAsO$_4$ | 8.4 | 1.34 | | | 1,770 | |

[1] Based on total weight.
[2] Gram moles flux/gram atoms Al × 100.
[3] Calculated as percent weight gain in converting the amount of Al in wafer to Al$_2$O$_3$.
[4] Applied dry.
[5] Postulated to form BiO in reaction.

Items d, and j exude globules of aluminum amounting to 5.6% and 77% of the original metal respectively. The other items do not lose aluminum.

EXAMPLE 6

Commercial aluminum wool of 98.1% purity (1.1% manganese is the primary impurity) is annealed by heating at 650° F. for 1 hour. The annealed wool is then chopped into fine staples having an average length of less than ¼ inch in a Waring Blendor. The chopped wool is thoroughly mixed dry with various amounts of powdered mangesium oxide, chromic oxide and sodium acetate (all of reagent grade) in a double-bladed home-type mixer as shown below.

STARTING MATERIAL WEIGHT RATIO

| Item | Aluminum | MgO | $Cr_2O_3$ | Sodium Acetate, percent of total weight |
|---|---|---|---|---|
| a | 2 | 1 | 1 | 0 |
| b | 1 | 1 | ½ | 0.6 |
| c | 1 | 1 | 0 | 2 |
| d | 1 | 1 | 0 | 0 |
| e | 2 | 1 | ½ | -------- |

The well-mixed dry material (2600 to 3500 grams, depending on density) is loaded into a mold 9″ x 4½″ x 3″ deep and compressed under 1500 p.s.i.

The compressed bricks are removed from the mold and given the following heat treatment in an air atmosphere:
(1) 25° to 150° C. in two hours.
(2) 150° to 600° C. by increasing temperature 25°/hour.
(3) 12 hours at 600° C.
(4) 600° to 650° C. in 1 hour.
(5) 7 hours at 650° C.
(6) 650° to 1350° C. at an increase of 50°/hour.
(7) 48 hours at 1350° C.
(8) Cool furnace in 24 hours and unload.

A portion of each mixture is molded into ¼″ x ¼″ x 2″ test bars and submitted to the same firing schedule.

The fired bricks and test bars are extremely hard, strong, resistant to abrasion and correspond closely to the dimensions of the unfired pieces. The maximum change observed is a 4% increase in the length of brick c.

Properties measured on the test bars are given below:

| | Bulk Density, gram/cc. | Flexural Strength, p.s.i. | | Hot Load Subsidence, percent |
|---|---|---|---|---|
| | | 25° C. | 1,550° C. | |
| a | 1.80 | 1,970 | 3,560 | 2 |
| b | 1.96 | 1,530 | 1,030 | 6 |
| c | 1.65 | 738 | 479 | 1 |
| d | 1.75 | -------- | -------- | -------- |
| e | 1.99 | -------- | 2,810 | -------- |

Examination of cut sections of the brick of item c above under a petrographic microscope shows that the brick is a cellular body having a continuum consisting essentially of a substantially homogenous refractory composed of alumina and magnesia. The crystals of the continuum are extremely small with only a few as large as 5 microns in diameter. The cells of the brick are substantially isolated from one another. Most of the cells are filled with unreacted magnesia. The remainder of the cells are empty and correspond to the shape of the original metal fibers. Treatment of the sample with formic acid at 80° C. for 60 hours extracts 22% of the weight and leaves a strong continuous skeleton.

Note: Item e is made with aluminum grained ingot of a particle size such that it passes through a 28-mesh sieve and is retained on a 42-mesh screen.

The preparation of item c illustrates the use of a preferred fluxing agent. This product has a weight gain corresponding to 92% conversion of the aluminum. It has a uniformly dense cross section. Item d which used part of the magnesium oxide as a fluxing agent only shows a 63.5% conversion and has a very dense skin with a soft friable center. Both products are strong and useful as refractories.

The above procedure may be used to make compositions corresponding to:

| | Percent |
|---|---|
| $Al_2O_3$ | 19 to 66 |
| MgO | 11.5 to 90 |
| $Cr_2O_3$ | 0 to 58.5 | where the sum of these three components is equal to 98–100% by weight. This class of refractories is especially useful for applications where a resistance to high temperature and corrosive environment is required. The basic open hearth steel furnace, especially those using oxygen lances, is an example of such applications.

The integral skeleton of items a and b is primarily composed of a solid solution of $Cr_2O_3$ in spinel. Items d and e have skeletons of spinel. The latter has some inclusions of a solid solution of $Cr_2O_3$ in alpha alumina.

EXAMPLE 7

This example shows the outstanding physical properties of the products of this invention.

Items a to f are made using aluminum metal according to the previous examples under the conditions defined in Table VI. Item d is made into a very low density structure fired at 800° C. to a 35% by weight conversion of aluminum. The partially converted structure is then broken into particles about 10 mils long, compacted and refired under conditions shown.

Items h, i and g are commercially available samples of refractories of similar composition as identified in Table VII. Item g analyses 81% $Al_2O_3$, 17% $SiO_2$ and 1.6% $Na_2O$. Item h analyses 99% $Al_2O_3$ and 0.6% $SiO_2$. Item i analyses 97% $Al_2O_3$. Items g and h are presumed to be bonded hollow alumina spheres. Item i is presumably made by firing a foamed mixture.

Table VIII compares characteristics and properties of the samples identified above. The superior flexural strength of the products of this invention over items g-i obviously, presents a difference in kind. In addition to the characteristics reported in the tables, it is noted that the average grain size of the aggregate particles of samples a-f incl. is about 1 micron or less. This compares with a 50-micron and 6.5-micron grain size in the structure of samples h and i respectively. The porosities of items c, e, f, g, h, and i of Table VIII were calculated from the apparent density and the density of the crushed solids, while the porosity of item d was determined from the bulk density and the calculated density.

*Table VI*

| Sample | Metal Form | Flux. agent | Amt. Flux[1] | Firing Cond. | |
|---|---|---|---|---|---|
| | | | | Max. Temp. (° C.) | Period (hr.) |
| a | Flake | Sod. acetate | 1.5 | 950 | 16 |
| b | Fiber | do | 1.5 | 1,000 | 3 |
| c | Wool[2] | Pot. oxide | 0.5 | 1,600 | 1 |
| d | do.[2] | Sod. oxide | 0.5 | 1,250 | 4 |
| e | Fiber | Sod. silicate | 18.0 | 1,500 | 4 |
| f | do | do | 20.0 | 1,000 | 8 |

[1] Percent by weight based on metal used.
[2] Commercial grade.

*Table VII*

| Sample | Trade Name | Source |
|---|---|---|
| g | Alfrax B1 | Carborundum Co., Perth Amboy, N.J. |
| h | Alundum L | Norton Co., Worcester, Mass. |
| i | Ipsen 3400 | Ipsen Industries, Inc., Rockford, Ill. |

Table VIII

| Sample | Bulk Density g./cm.³ | Porosity Percent | Average Cell Size (Microns) | Flex. Strength 25° C. | Flex. Strength 1,550° C. | Abrasion Loss (gms.) |
|---|---|---|---|---|---|---|
| a | 1.10 | 48.0 | 167 | 720 | 1,330 | -------- |
| b | 1.90 | 46.5 | 85 | 2,420 | 1,704 | -------- |
| c | 1.42 | 61.3 | 87 | 1,710 | 2,200 | 0.02 |
| d | 2.05 | 45.0 | 129 | 11,000 | 2,750 | 0.01 |
| e | 1.62 | 55.8 | 119 | -------- | 1,020 | -------- |
| f [1] | 0.74 | 79.6 | -------- | 1,140 | -------- | -------- |
| g | 1.22 | 68.7 | 100–150 | 230 | 25 | 0.4 |
| h | 1.19 | 70.0 | 80–150 | 250 | 16 | 0.6 |
| i | 0.46 | 88.3 | 130–630 | 40 | Nil | 1.7 |

[1] Photomicrograph of fragmented elevation shown in Figure V.

EXAMPLE 8

This example shows the effectiveness of the flux employed in the process. In each of samples *a* to *o* incl. of Table IX, about 1.5–4.5 grams of a commercial aluminum staple (average diameter of about 0.010 inch and about 0.5 inch long) containing 1.2% manganese is formed into a ¼ x ¼ x 3-inch bar. A measured amount of an aqueous solution of a metallic acetate flux (a precursor of the oxide) as identified in the table is dropped onto the aluminum bar which is then dried at 150° C. Each dried bar has an apparent density of between about 0.5 and 1.5 grams/cm.³ (80 to 45% porosity). The dried weight of each bar is used to calculate the percent of metal oxide based on the weight of aluminum that is present under the firing conditions. The acetate salts are known to convert quantitatively to the oxides on heating in air at about 500° C.

The dried bars are placed in electrically heated furnaces with an air atmosphere and heated at various temperatures for the periods (hours) indicated in Table IX. The weight gain reported is in terms of the percentage of that theoretically possible.

The products of *a* to *j* incl. are all hard, strong, abrasive resistant articles having a continuous skeleton of alumina. They have apparent densities of 0.78 to 2.3 grams/cm.³ (porosities of 42 to 80%). The original fibers are bonded together by alumina and cannot be picked out of the structure. Similar structures are also made at 750° C. with lithium and sodium acetate as fluxes (0.5 and 1% respectively). All items made without a flux (*k* to *o* incl.) are soft, friable and can be easily picked apart with a needle or tweezers to yield the original fibers with only a thin coating of alumina. Flexural strength for these latter items are not given since they elongate and deform similar to the original metal rather than break under stress.

Other fluxes such as NaOH, NaAlO$_2$, sodium potassium tartrate, sodium methoxide and barium stearate or their precursors are also suitable.

Table IX

| Sample | Flux | Percent Flux | Temperature | Period | Weight gain |
|---|---|---|---|---|---|
| a | Li$_2$O | 1.5 | 900 | 5–6 | 83 |
| b | Li$_2$O | 0.4 | 950 | 3 | 60 |
| c | Li$_2$O | 0.06 | 1,000 | 15–16 | 17 |
| d | Na$_2$O | 0.5 | 800 | 24 | 86 |
| e | Na$_2$O | 0.35 | 900 | 16 | 50 |
| f | Na$_2$O | 0.5 | 1,250 | 16 | 78 |
| g | K$_2$O | 0.45 | 880 | 24 | 92 |
| h | MgO | 1.5 | 1,300 | 40 | 64 |
| i | BaO | 1.0 | 1,000 | 1 | 30 |
| j | BaO | 1.2 | 1,300 | 40 | 57 |
| k | None | | 850 | 15–16 | 1 |
| l | ---do--- | | 850 | 40 | 6 |
| m | ---do--- | | 1,000 | 24 | 5 |
| n | ---do--- | | 1,150 | 15–16 | 8 |
| o | ---do--- | | 1,250 | 15–16 | 24 |
| p | ---do--- | | 1,250 | +40 | 28 |
| q | ---do--- | | 1,300 | 15–16 | 12 |
| r | ---do--- | | 1,300 | 40 | 19 |
| s | ---do--- | | 1,300 | 66 | 31 |

EXAMPLE 9

Commercial aluminum wool (alloy 3003) is pickled for 15 minutes at 50–60° C. in a solution consisting of 0.2 g. chromium sulfate, 14.4 g. potassium dichromate, 7.75 g. sodium hydroxide and 155 g. of water. The aluminum wool is removed and washed well with water to remove all traces of yellow color and dried. The emission spectrograph on the treated wool shows less than 200 parts/million potassium, 50–250 parts/million sodium, and 1–5% chromium.

44.5 g. of the pickled aluminum wool is chopped to staple in a 1-gallon Waring Blendor and compressed in a mold at 2,000 p.s.i. to a block 2¼" in diameter by 2" high.

The block is placed in an electrical furnace at 725° C. for 16 hours, weight 43.4 g. It is refired at 850–950° C. for 24 hours, weight 48.7 g. The block is then placed in a Selas gas furnace and heated at 1200° C. for 1 hour and 2 hours at 1600° C. The final weight is 71.2 g. or 67.5% of theoretical gain.

Test bars cut from the fired block show a porosity of 49% and have a flexural strength of 360 p.s.i. at 1550° C. (corrected to 710 p.s.i. based on porosity). Microscopic examination of the broken bars shows a well integrated homogeneous alumina skeleton containing a solid solution of Cr$_2$O$_3$.

EXAMPLE 10

Mixtures of a clay and different forms of aluminum metal are mixed with an amount of water such that the mixture retains its granular character and pressed into a 3" x 6" x 2" mold under about 1500 p.s.i. pressure. The molded bars are dried in a vacuum oven at 100° C. for 12 hours and then weighed. The bars are fired in an electrically heated oven with the following cycle: 6.5 hours room temperatures to 1000°; 4 hours at 1000°; 6 hours at 1000–1260°; 10 hours at 1260°; and 23 hours cooling 1260° to room temperature. Air at about 25° C. is flowed through the 37-cubic foot oven at a rate of 7 cubic feet per minute. The fired bars are weighed, measured and sectioned for various tests.

The clay used is a bonding clay (Cedar Heights Clay Co., Oakhill, Ohio) which has the following analysis:

Ignition loss 9.4%, SiO$_2$ 57.3%, Al$_2$O$_3$ 28.5%, Alkali metal oxides 1–5%, MgO 0.22%, CaO 0.08%, Other impurities 3.5%.

The following types of aluminum are used:
(1) flake (Alcoa 151 aluminum flake)—about 4 to 20 mesh
(2) grained ingot (G.I.) (Alcoa 99.6) about 28 to 42 mesh
(3) mill granules (M.G.) (Reynolds) 30–100 mesh of which 66% is retained on a 60-mesh screen and 86% is retained on an 80-mesh screen
(4) powder (B & A aluminum metal dust, code 1220) 70% passes a 325 mesh and 89% passes 200 mesh.

Results are give in Table X. The weight gain is the percent of the theoretical weight gain from complete oxidation of the aluminum corrected for the ignition loss of the clay (9.4%) and assuming no reduction of any constituents by the aluminum. Items *a–g* are all strong (flexural strength at 25° C. of 600 p.s.i. or more) useful products. They are significantly superior in thermal shock resistance to products of similar composition made from aluminum powder as shown in the table.

The fired samples have the following average percent wraping according to the aluminum form:

Percent
Flake _____ 0.70
Grained ingot _____ 0.29
Mill granules _____ 0.36
Powder _____ 10.6

It is characteristic of the products formed from aluminum powder that they warp badly and at times show large craters and/or large cracks on the surface. Examination of the cut sections of these bars show a multiplicity of large cracks (0.5 to 6 mm. wide and ranging from 6 to 32 mm. in length) in many of the sections examined. The products made from grain ingot, mill granules, flake as well as chopped foil and fibers are characterized by a significantly lower percent wraping and the almost complete lack of the form deficiencies noted above for powder-derived products.

Photomicrographs of polished samples show that items a–g all possess continuous dense skeletons. Items h–j do not have this continuous dense skeleton. The solid units of the latter structures are less than 0.06 mil thick and 0.06 mil between voids. They resemble (at 750X) a pile of sand in which the diameter of the grains is larger than the point of contact with adjacent grains.

Sections (1″ x 1″ x 1.5″) are cut from the fired bars of items i, d, and e, and heated in a gas-fired furnace at 1630° C. for 12 hours. The sample made from aluminum powder (i) is very badly cracked on all faces. The other samples are relatively unchanged in appearance by this treatment and show the superiority of the products of this invention.

When the above examples are repeated using 10% nonpowder metal and 90% of the clay, a relatively weak product with a heterogenous structure and lacking the integral skelton of alumina is obtained. The use of 20% nonpowder metal does afford a continuous alumina skelton but it is not completely homogenous and is inferior as regards flexural strength, compared to products made of 30–70% aluminum and 70–30% of the above clay. The use of a prolonged firing (e.g., 86 hours) greatly improves the homogeneity of the low aluminum sample.

Useful products can be made from clays and 70 to 95% aluminum but the process is less desirable due to the difficulty of obtaining a uniformly dense structure free from a skin coating.

Samples of the fired products are ground to powders and X-ray diffraction photographs made. Items a–h show a strong pattern for alpha alumina as the crystalline component present in the largest amount. Item i (from 50% powder) shows equivalent amounts of alpha alumina and elemental aluminuma while item j (from 70% powder) contains more elemental aluminum than alumina.

All samples show the presence of elemental silicon in amounts varying from a trace (items f and g) to an amount equal to the alumina (item i).

Aluminum nitride is present in items b, d, (49% estimated), e, f, g, i, and j.

The characteristic X-ray pattern for mullite $$(3Al_2O_3 \cdot 2SiO_2)$$

is found in the photographs of items a, b, (equal to alumina), c (equal to alumina) and g.

Table X

| Item | Aluminum | | Weight Gain, percent | Properties of Fired Bars | |
|---|---|---|---|---|---|
| | Percent | Form | | Bulk Density | Thermal Shock (Cycles) |
| a | 30 | Flake | 52 | 1.86 | >3,000 |
| b | 30 | G.I. | 24 | 2.08 | >2,700 |
| c | 30 | M.G. | 51 | 1.85 | 1,029 |
| d | 50 | Flake | 42 | 1.52 | 1,131 |
| e | 50 | G.I. | 22 | 2.05 | >1,900 |
| f | 70 | G.I. | 36 | 2.03 | >1,900 |
| g | 70 | M.G. | 58 | 1.33 | >3,000 |
| h | 30 | Powder | 47 | 2.03 | 360 |
| i | 50 | ---do--- | 20 | 1.87 | 42 |
| j | 70 | ---do--- | 7 | 1.92 | 306 |

EXAMPLE 11

This example shows the critical effect of the catalyst in the process. A clay (Hamilton No. 2 clay from United Clay Mines from Trenton, New Jersey) containing 0.2% $K_2O$, 0.2% $Na_2O$ and 0.09% CaO is used. An aqueous solution of $K_2CO_3$ is added to a 10-gram sample of the clay, well mixed and the mixture dried at 100° C. in a vacuum oven. The dried clay is then ground to pass 60 mesh. Equal parts of the clay and the aluminum flake of Example 10 are mixed with a small amount of water so that the mixture retains its granular character and pressed into a ¼″ x ¼″ x 2″ bar under about 1500 p.s.i. pressure. The molded bars are dried in a vacuum oven at 110° C. for 12 hours, placed in a cold oven which is heated at 1000° C. in about 4 hours and then maintained at 1000° C. for 12 hours.

The results obtained with varying amounts of $K_2O$ (derived from the $K_2CO_3$) are given in Table XI. It is observed that the heterogeneous appearance (a salt and pepper appearance of mixed white and gray areas resulting from the clay and aluminum) of items a to c correlate with poor strength, low weight gains and low concentrations of alkali metal oxides. Items d–g with greater amounts of alkali metal oxide are characterized by a uniform gray color (this is postulated to indicate wetting of the clay and alumina by molten aluminum in the process) with little or no beading of aluminum on the surface and significantly superior flexural strengths.

In a similar manner, useful articles are made from aluminum and a Stratton clay and a Yankee ball clay to which had been added the equivalent of 3% $K_2O$ (from $K_2CO_3$). These clays lacked sufficient alkali to yield a good product without the added catalyst.

Table XI

| Item | Clay Composition | | Weight Gain percent of dry wt. | Flexural Strength at 25° C., p.s.i. |
|---|---|---|---|---|
| | $K_2O$ added, percent | $K_2O + Na_2O$ Total, percent | | |
| a | 0 | 0.4 | [1] −5.1 | 440 |
| b | 0.5 | 0.9 | −5.1 | 420 |
| c | 0.9 | 1.3 | 5.8 | 2,380 |
| d | 1.9 | 2.3 | 11.2 | 2,720 |
| e | 2.5 | 2.9 | 11.0 | 3,360 |
| f | 2.9 | 3.3 | 8.9 | 5,350 |
| g | 3.3 | 3.7 | 7.6 | 3,350 |

[1] Estd.

It has been found that the presence of about 1% to 4% or more of CaO (or its precursor) in the clay (or added to the clay) has a synergistic effect on the process at 1000° when the amount of alkali metal oxide present is at least about 1% based on the clay.

EXAMPLE 12

This example shows other siliceous compounds—

The procedure of Example 10 is followed to make refractory bars from the metals of that example and the following siliceous compounds:

(1) A horticultural grade vermiculite (4–6 Stirle by American Firstline Corp of Jamaica, New York) with the nominal formula of $6MgO \cdot 8SiO_2 \cdot 10H_2O$.

(2) A chrysolite type asbestos (Asbestos Corporation of America of Garwood, New Jersey) with the nominal formula of $3MgO \cdot 2SiO_2 \cdot 2H_2O$.

(3) A fire clay analyzing $SiO_2$ 60.7%, $Al_2O_3$ 23.7%, alkali metal oxides 0.2–1.0%, MgO+CaO 0.24%, ignition loss 9% and other impurities about 6.3%.

(4) A grog from a low duty brick analyzing $SiO_2$ 52–57%, $Al_2O_3$ 33–38%, alkali oxides 2–3.5%, CaO 0.2–0.6%, MgO 0.5–1.0% and 4–7% other impurities. Results are shown in Table XII.

The magnesium oxide constituents of (1) and (2) serves as the catalyst for items a–l. The alkali metal oxide content of the grog is the effective catalyst for items *m* and *n*.

The vermiculite affords relatively high conversion of the aluminum and relatively low density products.

The products are all relatively strong, highly abrasion resistant with good thermal shock resistance and have continuous dense skeletons containing aluminum oxide.

pressed into bricks and fired slowly to 1570° C. where they are held for 14 hours to assure good bonding of the MgO. Although these bricks show good flexural strength at 25° C. (600–2300 p.s.i.) they are extremely weak at 1550° C. (70 p.s.i. maximum)

As another comparison the fired composition of item K is duplicated by mixing ignited alumina fused MgO

*Table XII*

| Item | Aluminum, Percent | Form | Siliceous Compound | Weight Gain Percent of Theory | Bulk Density After Firing |
|---|---|---|---|---|---|
| a | 30 | Flake | Vermiculite | 68 | .94 |
| b | 30 | G.I. | do | 77 | .54 |
| c | 30 | M.G. | do | 30 | .62 |
| d | 50 | Flake | do | 85 | .99 |
| e | 50 | G.I. | do | 85 | .74 |
| f | 50 | M.G. | do | 38 | .71 |
| g | 70 | Flake | do | 83 | .90 |
| h | 70 | G.I. | do | 81 | 1.08 |
| i | 70 | M.G. | do | 52 | .79 |
| j | 30 | G.I. | Asbestos | 45 | 1.07 |
| k | 50 | G.I. | do | 73 | 1.35 |
| l | 70 | G.I. | do | 47 | 1.52 |
| m | 40 | G.I. | Fire clay/grog 12/48 | 30 | 1.85 |
| n | 60 | Flake | Fire clay/grog 8/32 | 53 | 1.19 |

EXAMPLE 13

Aluminum metal in the form of fibers (about 5–8 mil diameter) is mixed with various siliceous compounds, molded into test bars and fired as shown in Table XIII.

A 50% aqueous slurry of the talc or forsterite is used in items *a–d*. The sodium silicate (76% $SiO_2$) is applied without dilution for items *e* and *f*. The lead silicate is mixed as a dry powder.

X-ray diffraction patterns of item *e* show a strong pattern for alpha alumina, the presence of some aluminum nitride, the absence of elemental aluminum and the presence of elemental silicon.

Item *f* has a porosity of 55.8% and an average cell (pore) size of 119 microns.

Item *g* has a porosity of 58%.

and powdered $Cr_2O_3$ in the conventional manner, molding bricks and firing slowly to 1500° where they are held for 72 hours to assure maximum binding (item L).

Weighed sections of some samples are extracted in 12.5% aqueous formic acid at 100° C. for 22 hours. Spinel ($MgO \cdot Al_2O_3$) is insoluble under these conditions. The weight of the insoluble residue agrees reasonably with the weight of spinel that would be predicted from the compositions.

Results are shown in Table XIV.

Items D–K display the continuous integral skeleton of this invention which is resistant to formic acid. They also show a flexural strength at 1550° that is from 20 to 200 or more times as great as comparable controls (items A, B, and L).

*Table XIII*

| Item | Al., Percent | Siliceous Compound | Maximum Time (hours) | Firing Temp., °C. | Weight Gain, Percent of Theory | Properties of Fired Product | | |
|---|---|---|---|---|---|---|---|---|
| | | | | | | Bulk Density | Flexural Strength | Impact Strength |
| a | 48 | $3MgO \cdot 4SiO_2 \cdot 1H_2O$ (talc) | 33 | 1,500 | 58 | 2.05 | 3,030 | |
| b | 80 | $3MgO \cdot 4SiO_2 \cdot 1H_2O$ | 33 | 1,500 | 88 | 1.49 | [1] 1,580 | 9.5 |
| c | 42.7 | $2MgO \cdot SiO_2$ | 60 | 1,425 | 40 | 2.16 | [1] 2,520 | 1.8 |
| d | 91.9 | $2MgO \cdot SiO_2$ | 60 | 1,425 | 83 | 2.05 | [1] 5,520 | |
| e | 70 | $Na_2SiO_3$ | 55 | 1,000 | 100 | 1.31 | 1,220 | |
| f | 82 | $Na_2SiO_3$ | 4 | 1,500 | | 1.62 | [1] 1,020 | 4.5 |
| g | 34 | $PbSiO_3$ | 4.5 | 1,200–1,550 | | 1.26 | [2] | |

[1] At 1,550° C.
[2] Quite strong.

EXAMPLE 14

This example shows the critical effect of a skeleton structure upon properties.

Various mixtures of grain ingot form aluminum 20 mesh and finer (about ⅓ 10/20 mesh, greater than ½ 30/60 mesh and a little 60/80 mesh) and fused MgO 40-mesh and finer are formed into 2¼" dia. by 3" long cylinders by molding at 1500 to 6000 p.s.i. pressure. The MgO is made of sieved fractions designed to provide optimum packing. The bricks are slowly fired (over a period of about 47 hours) to 1400° C. and held at that temperature for an additional 48 hours. The bricks are sectioned for examination.

As a comparison for the effect of the structure of this invention twenty different compositions of the electrically fused MgO of different particle size distribution are Item L does not have a skeletal structure. Photomicrographs of a polished section show the ceramic phase present primarily as isolated areas of about 1 to 4 mils in diameter with a continuous phase of voids surrounding them. This is in contradistinction to the interconnected walls of the structure of this invention. Although some of the areas in the photomicrograph respresenting ceramic appear attached, the maximum distance that can be traversed through a curved path 0.3 mil wide, is 14 mils in a field of view of 40 mils and the average distance that can be traversed without interruption by a void or different phase is 2.4 mils. By contrast, photomicrographs of random cross sections of a product of this invention similar to item K exihibit skeletal walls (surrounding voids of 10–20 mils in diameter) that can be followed continuously through a field of view of 465 mils. Without retracing, a path that is at least 0.3 mil wide can be readily followed for a distance of 2000 mils.

Item L contains pores within the ceramic phase that are less than about 0.5 mil in diameter as compared to the ½, 200-mils average diameter pores in the skeleton of the products of this invention.

A mixture containing 30.3% of aluminum in grain ingot form, 57% of fused magnesia and 12.7% of chromic oxide is made and divided into two portions. One portion is molded into a brick (item M). To the other portion is added an amount of silica flour equal to 4% of the weight of the mixture. It is then mixed well and molded into a brick (item N). Both bricks are dried and fired as above and yield excellent products. However, the silica-containing brick has a flexural strength at 1550° C. of only 990 pounds per square inch compared with a value of 2420 p.s.i. on the other brick (item M).

While applicant does not wish to be bound by any particular theory, it is believed that, under the conditions of the oxidation the fluxing agents applied to the surface of the metal particles act to release the protective oxide coating which is characteristic of the aluminum, as rapidly as these coatings form, thereby permitting progressive oxidation. In addition to promoting the release of the protective oxide coatings from the metal surfaces, the fluxing agent also appears to act as an oxidation transfer agent, thereby hastening the oxidation process. When size and density of metal particles in the green form permits, the simultaneous production and release of the protective oxide coating from each particle source tends to diffuse one into another, thereby providing a mutual molecular intra-distribution of oxide that results in a self-bonded final structure. During the process, the oxidized form of the nominal element of the flux-

TABLE XIV

| Item | Feed Composition, percent | | | Flex at 1,550° C. | Extraction with Formic Acid NB 2067-127 | MgO Sieve Analysis | | |
|---|---|---|---|---|---|---|---|---|
| | Al | MgO | $Cr_2O_3$ | | | Coarse 40/60 | Medium 100/200 | Fine $-200$ m. |
| A | 0 | 100 | 0 | [1]170 | | | | |
| B | 5.6 | 9.12 | 3.2 | 55 | Loose grains | 10 | 52 | 38 |
| C | 8.5 | 87.2 | 4.3 | | Crumbled upon handling | 10 | 52 | 38 |
| D | 11.7 | 82.8 | 5.5 | 1,030 | Open network | 5 | 59 | 36 |
| E | 14. | 80 | 6.6 | 710 | Coherent structure | | | |
| F | 15. | 79. | 6.0 | 5,570 | | 5 | 59 | 36 |
| G | 15.0 | 79. | 6.0 | 2,960 | | 5 | 59 | 36 |
| H | 18.5 | 75.7 | 5.8 | 1,680 | | 5 | 59 | 36 |
| I | 18.5 | 75.7 | 5.8 | 2,190 | | | | |
| J | 22.2 | 71.8 | 6.0 | 1,070 | | | | |
| K | 30.3 | 57.0 | 12.7 | 2,000–3,000 | Solid structure | | | |
| L | 0 | 45 | 10 | 12 | | | | |
| M | 30.3 | 57 | 12.7 | 2,420 | | | | |
| N[2] | 30.3 | 57 | 12.7 | 990 | | | | |

[1] Maximum.
[2] Plus 4% by weight of silica flour.

EXAMPLE 15

A mixture of 1 part of 20/30 mesh grain ingot aluminum and 2 parts of 20/40 mesh dead burnt magnesite is poured onto the hearth of a gas-fired furnace at a temperature of 1550° C. and heated at that temperature for 30 minutes. The greater portion of the cooled product crumbles upon removing the sample from the oven. A small center section survives the handling but is so weak and friable that it can be cut (with crumbling) with a dull pocket knife. It does not have the dense skeletal structure of products of this invention. When another portion of above mixture is molded and fired as in Example 6, a hard, abrasion-resistant brick with strength equivalent to products of Example 6 and having a continuous skeleton is obtained.

EXAMPLE 16

Aluminum particles (grain ingot, 30/60 mesh) are wetted with a 2% solution of sodium acetate in alcohol and the excess liquid drained off. One volume (75 grams) of the treated metal is thoroughly mixed with 10 volumes (835 grams) of dead burnt magnesite (Mg), 200 mesh. The mixture is poured into an alumina crucible and the crucible slowly heated in an oven to 1100° C. at which temperature it is held for 24 hours. The cool mixture is screened through a 100-mesh screen to remove the unreacted magnesia.

The coarse particles retained by the serum weigh 330 grams (bulk volume of 310 ml.) are roughly spherical in shape and have a large spherical pore or void (about 10 to 23 mils in diameter) in each particle. X-ray diffraction data show the particle to be composed of approximately equal amounts of MgO and Spinel.

When the magnesia is replaced with an equal volume of alumina (−100 mesh) similar products are obtained composed of dense, fine grain alumina with unreacted aluminum in the central cell and in micropores of the wall surrounding the cell.

ing agent is at times diffused through the metal oxide which is formed "in situ." At other times the fluxing agent is lost to the atmosphere during the firing. In certain combinations of metal and refractory fillers, chemical reaction occurs between the materials fired to produce spinels for example.

As previously pointed out, prior to heating the shaped metal aggregate particles in an oxidizing atmosphere, the surfaces of the aggregate particles are intimately contacted with a fluxing agent as previously identified. The agent may be applied to the surface of the metal particles prior to their aggregation or at any other time prior to the final heating operation. Preferably the agent is applied to a "loose" aggregate, i.e., an aggregate less compact than the shaped one to which the firing operation is applied. Such a technique assists in efficient application of the agent to the metal surface with good distribution through the body of the aggregate. When using funicular or elongated shapes the aggregate is compacted into a loose batt or preform having a bulk density of 0.01 to 75% of the solid metal. The particles in the batt are then contacted with the fluxing agent. The agent may be applied dry, in solution, as a gas or as a melt. The manipulative technique of contacting the metal surface with it is not critical. Thus it may be powdered or sprayed upon the metal, or the metal may be dipped in a solution of the agent or its melt or powder. It is conveniently done using a concentrated aqueous solution or slurry. The use of pressure and/or vacuum to assist in uniform and complete distribution of the agent over the particle surfaces is often advantageous. Furthermore, when using dilute solutions, the addition of a thickener such as sodium carboxy methyl cellulose may be advantageous. Particularly where the proportion of metal to filler refractory is low, the fluxing agent may be applied to the filler refractory and the metal shapes added to the moist mixture. As stated earlier, the filler refractory may also serve as a flux (e.g., MgO) and vice versa. In some instances as with certain minerals, the filler refractory may also contain the fluxing agent.

In cases where the flux itself does not act as a binder and especially when using 20 to 50% of aluminum in the form of slit foil or granules, it is advantageous to add minor amounts of water, ethyl alcohol, ethylene glycol, acetone, aqueous solutions of carboxy methyl cellulose, rubber, gum arabic, polyvinyl alcohol, polyvinyl pyrollidone, natural gums, glue and the like to increase the green strength of the shaped object. A self-bonding additive such as Sorel cement

or a mixture of magnesium oxide and saturated sodium chloride can also be used for this purpose. Preferably a material is used that will burn out under the firing conditions. From about 0.1% to about 2% binder is usually adequate. The amount of agent to be employed will vary depending upon the nature of the metal as well as the nature of the agent.

The fluxing agent is calculated on the basis of the metal oxide that it forms in those cases where a metal oxide precursor is used. The metal oxide or hydroxide can vary in amount from 0.02 to 20% based on the total weight of the aluminum. Preferably from about 0.2 to 5% is used. Higher concentrations of fluxing agent may be employed but are generally avoided, unless the fluxing agent also acts as a filler refractory, to prevent undue lowering of the melting point of the final structure and loss of strength at elevated temperatures.

After application of the fluxing agent to the loose batt of metal, the aggregate is then compression molded to the final desired shape. When forming structures containing about 20% by weight metal and more in the green form, the use of a ductile metal is preferred for improved formability at this stage, especially when intricate final shapes are desired. The indicated porosity can be achieved in any of several ways well within the skill of the art. For example, it may be controlled by the degree of compaction of the green body, by the introduction of materials which volatilize or burn off at the firing temperature, etc. The molded object is then dried.

The dried "green" molded object is then heated in an oxidizing atmosphere such as air, oxygen or mixtures of oxygen and inert gases at a temperature of at least about 400° C. but below the ignition temperature of the metal at the cencentration of oxygen employed. The exact conditions for firing will depend upon the green porosity of the shaped object, the amount of metal, the amount and kind of fluxing agent and the temperature. These interactions and variations among them will be apparent to one skilled in the art. In order to obtain substantially complete and homogenous oxidation of the metal particles, the above-mentioned variables should be selected so that a spontaneous and rapid ignition does not take place, or a spontaneous and rapid reduction of the non-aluminum constituents does not occur. In general at least the first stages of oxidation should be carried out at a relatively low temperature. For example, a temperature of about 700° to 1050° C. for a period of about ½ to 48 hours can be used with aluminum in combination with as little as 0.1 to 3% of an alkali metal oxide or hydroxide. The less active fluxing agent such as MgO in the amount of 0.1 to 10% will require from 1 to 72 hours at temperatures of 1000° to 1350° C. or higher. It is preferred to heat at a relatively low temperature initially, until a stress bearing oxide film develops which holds the molded shape of the aggregate during subsequent further oxidation at a higher temperature.

The temperature and period of the heating step are co-related functions. They will vary widely depending primarily upon the shape and concentration of the metal, the nature of the fluxing agent, the concentration of the fluxing agent and the nature of the oxidizing atmosphere. In general, any temperature below the melting point of the final fired refractory body may be employed, the higher temperatures favoring a decrease in the necessary period of heating. The heating is continued for a period of time sufficient to permit oxide growth which will result in a weight gain of at least 11% based on the weight of the green structure. The strength of the bond in the continuous skeleton type structure is believed due to the intra-distribution of oxide growth at a molecular level. The period of heating can be varied widely even with reference to any particular agent metal combination, depending upon the type of final product desired. In general, the oxidation will be carried out at a temperature of from 600° to about 1000° C. when using an atmosphere of air or an atmosphere containing an equivalent amount of oxygen and a normal amount of fluxing agent. It is desirable to have a preliminary oxidation step at a temperature close to the melting point of the metal, as, for example, 16 hours at 600° C. or 2 hours at 700° C. In the latter case, the structure must be well supported so that a minimum of strain is put on the object and the molten aluminum is not exuded. The extent of this preliminary oxidation will also depend upon the dimensions of the metal particles in the structure. The previous remarks apply to a 5-mil diameter filament. After an initial shell of oxide has been formed, then the secondary or final oxidation can be carried out at a higher temperature whcih may be 850° C. for 4 hours or as high as 48 hours at 1000° C. When only a thin skin of oxide is formed initially, followed by heating above the melting point of the metal, unoxidized metal is exuded. Using this process, the alpha crystalline form of alumina (corundum) is always formed regardless of the temperature used. Unoxidized metal may be melted out of the formed mass when particle morphology permits. This is an unusual phenomena which apparently results from the incompatibility of these metals and their oxides. When melted out, the metal appears in globules on the surface of the formed oxide structure from which it may be removed by abrasion, heat treatment, or the like. As much as 85% of the original metal employed may be recovered by this method. If a relatively thick skin of oxide is formed at the relatively low initial temperature, no metal is exuded on raising the temperature above the melting point, but a greatly increased rate of oxidation is observed. When two heating stages are desirable, it is preferred that there be no cooling between stages to obtain the most uniform products. Alternatively, the temperature may be progressively raised through the range desired at a rate adequate to form the initial shell and thereafter provide either melting out of unoxidized metal or further oxidation at increased rate as desired.

The rate of heating should be controlled so that the temperature of the unfired body does not exceed the ambient temperature of the furnace by more than 200° C. It has been observed when firing compositions similar to Examples 6 and 14 that if an exotherm of 200° C. or more occurs the fired bricks are badly cracked (as large as 0.5 inch wide at the surface), expanded and bulged and contain soft, friable centers. Sometimes an exotherm of 100° C. causes similar poor results so that preferably the rate of heating (including flow of air) should be controlled to prevent such an isotherm. More preferably the temperature of the body should not be permitted to exceed the ambient temperature by more than 50° C.

It will be understood that exothermic firing becomes more serious as the cross section of the green body is increased. The above considerations apply to bodies such as a cube of two inches to the side or larger.

The firing cycle (rate of heating as well as time at a given temperature) should preferably be selected so that no more than 5% of the original aluminum is exuded from the body.

A firing schedule similar to the following has been found to avoid the above exotherms and restrict the exudation of metal to less than 5% from a 9 x 4.5 x 3″ brick containing no filler refractory or a nonsiliceous one.

(1) Heat from about 120–500° C. for 3 to 4 hours to complete drying and heat up furnace lining.

(2) Heat at about 500° C. for 2 hours.

(3) Heat to 800° C. in about 2–3 hours, then hold at 800° for 5–6 hours.

(4) Heat to 850° C. and hold 8 hours.

(5) Heat to 900° C. and hold 8 hours.

(6) Heat to 1,000° C. and hold 8 hours.

(7) The above portion of the firing schedule is most critical. The firing can be continued at 1,000° or higher as desired. A useful schedule is to heat for each subsequent temperature increase of 100° C. for a period of 8 hours, more preferably up to 1400° C.

(8) about 1400° C. for an additional 40 hours to obtain maximum conversion and permit solid phase reactions with the filler refractory to occur.

During the heating operation the shaped aggregate may be under compression or free from compressive forces. Generally it is preferred to permit the natural growth of the oxide, although some pressure will tend to improve the diffusion between contiguous particles. The particles forming the aggregate of the original structure may be in random or patterned arrangement. Thus, although most of the examples using fiber are limited to randomly disposed particles, an orderly laydown of staple or tow may be employed to build up a suitable batt for conversion to refractory structures of the present invention. These fibers may be crimped if desired and conventional needling operations may at times be useful in forming dense or felted structures prior to oxidation. Honeycombs, woven screen, etc., and aluminum can be used.

Aluminum particles as previously described, mixtures of particles of aluminum and different metals, and particles of alloys of aluminum with other metals in which aluminum constitutes the major component may be used. The metal used is preferably clean and free from grease and oil. The aluminum particles should have one dimension of at least about 7 mills, (preferably 10 mils) a second dimension of at least 0.5 mil and a third minor dimension, i.e., between about 0.5 mil and 200 mils. For example, if spheres of aluminum are used, they must have a diameter between 7 and 200 mils (between about 3.5 and 80 mesh). Cylindrical rods as fibers must have a diameter of between 0.5 and 200 mils and a length of at least 7 mils. The length is not critical and can vary from short staple to continuous filaments.

Suitable fluxing agents for use in forming the structures of the present invention are, as defined above, any of (I) an oxide or hydroxide of a metal other than aluminum and (II) a precursor of the oxides of (I), the said oxides of (I) being of a metal from the class consisting of the alkali metals, the alkaline earth metals, vanadium, chromium, molybdenum, tungsten, copper, silver, zinc, antimony, and bismuth. The oxides and hydroxides of the alkali metals, magnesium, strontium and barium are preferred. Among suitable precursors of these materials may be mentioned the acetates, benzoates, bismuth thioglycolates, bisulfates, bisulfites, bromates, nitrates, nitrites, citrates, dithionates, ethylates, formaldehyde sulfoxylates, formates, hydrosulfites, hypochlorites, metabisulfites, methylates, oleates, oxalates, perchlorates, periodates, persulfates, salicylates, selenates, silicates, stearates, sulfates, sulfites, tartrates, and thiosulfates of the recited metals. While not "per se" within the class of useful fluxing agents, these compounds do, under conditions of the reaction, yield compounds within the above defined class. Thus sodium acetate, -benzoate, -bismuth thioclycollate, etc., will yield sodium oxide which is an oxide of an alkali metal. In addition, trialkyl tin oxide and lead silicate ($PbSiO_3$) are also useful as fluxing agents. Other fluxing agents can be found by means of the test cited below.

About 25 grams of the aluminum to be used in the process is placed in a 40 ml. alumina crucible ("alundum" made by the Norton Company of Worcester, Mass.) The crucible is placed in an electric furnace to melt the aluminum, removed and the surface of the metal skimmed to remove any extraneous aluminum oxide. A pocket forms in the center of the aluminum surface upon cooling. The major portion of a one gram sample of a powdered fluxing agent candidate (a metal oxide or hydroxide or a compound which may be expected to form a metal oxide under the conditions of the test) is placed in the pocket. A minor amount of the powder is placed so it contacts both the aluminum and the crucible at the edge. A control using powdered alumina is also prepared.

The crucibles are placed in an electrically heated furnace with an air atmosphere and heated at 1000° C. for 10 hours. The crucibles are slowly cooled and examined for a reaction. If the candidate is an effective flux at the first temperature tried, the test may be repeated at some lower temperature (e.g., 850° C.) to better classify the effective temperature. If no reaction occurs on the first trial, higher temperatures (e.g., 1300 and 1400° C. in turn) may be tried.

The most effective flux agents (class 1) are characterized by their complete disappearance, a darkening of the aluminum surface and the appearance of a black color on the outside of the crucible. With less effective flux agents (class 2) the blackening of the crucible is not observed but (1) the surface of the aluminum is darkened and (2) the flux candidate does disappear and/or the aluminum has foamed in comparison with the control. Those candidates which do not fulfill the above requirements but which do at least partially fuse into the surface of the metal are considered class 3 fluxes.

If all of the candidate is still loose on the surface of the aluminum it is not considered to be a fluxing agent for this process.

The candidates must be restricted to substantially nonvolatile compounds or else run under pressure in order to obtain valid results.

Following are some fluxing agents classified by this test:

*Table XV*

| Candidate | At 850° C. | At 1,000° C. | At 1,300° C. |
|---|---|---|---|
| LiOH | Class 2 | Class 1 | |
| $NaC_2H_3O_2$ | | do | |
| $K_2C_2O_3 \cdot H_2O$ | | Class 2 | |
| $Mg(OH)_2$ | | | Class 2. |
| $Sr(OH)_2 \cdot 8H_2O$ | | | Do. |
| $BaCO_3$ | | Class 1 | |
| $V_2O_5$ | Class 2 | Class 2 | |
| $MoO_3$ | | do | |
| $WO_3$ | | | Do. |
| $Na_2SiO_3$ | Class 1 | | |
| NaOH | do | | |

The atmosphere of the firing operation must be oxidizing in character. Most conveniently air is employed for this purpose. However, the process may be speeded up by enriching the atmosphere with oxygen or ozone. Other oxidizing atmospheres which may be employed are argon-oxygen and helium-ogygen mixtures. It is preferred to avoid the use of nitrogen containing gases.

As is illustrated above, the green structures of the present invention may contain up to about 81% of a filler refractory. Generally these may be any of the carbides of aluminum, boron, hafnium, niobium, silicon, tantalum, thorium, titanium, tungsten, vanadium, and zirconium; the nitrides of aluminum, boron, hafnium, niobium, tantalum, thorium, titanium, uranium, vanadium, and zirconium; the borides of chromium, hafnium, molybdenum, niobium, tantalum, titanium, tungsten, vanadium and zirconium; or the oxides of aluminum, berylium, cerium, hafnium, lanthanum, magnesium, uranium, yttrium, the stabilized oxide of zirconium and less preferably silicon dioxide. Precursors and mixtures of and compounds containing the aforementioned refractory compounds can also be used.

Where a non-porous coating upon the refractory is desired, coatings such as aluminum oxide, zirconium oxide, titanium dioxide, tantalum, a silicide, and the like may be applied by conventional metal spraying techniques. The voids of the refractory can also be filled with metals, other refractories, glasses or polymers, either by after treatment or by incorporating a material (such as fibrous potassium titanate) in the green form before firing.

The products of this invention are useful as structural components of apparatus which must withstand high temperatures, as bricks for furnace linings, insulating panels, crucibles, shaped abrasives, bearing materials, missile nose cones, catalysts and catalyst supports, tube sections, motor casings, bearings, electronic coil cores, electronic tube sockets, light weight rigid fire-resistant walls, rocket engine linings, jet engine exhaust linings and others.

The process of this invention may also be used to provide coatings of a refractory upon suitable surfaces. The mass of metal particles and flux may be fired in contact with the surface of the object to be coated.

The unfired or partially fired objects of this invention may be welded to each other by placing in intimate contact and firing further.

Many equivalent modifications will be apparent to those skilled in the art from a reading of the above without a departure from the inventive concept.

What is claimed is:

1. A refractory body having a porosity of between about 15 and 95% and consisting essentially of (1) a skeletal structure of interconnected walls which define closed cells, said skeletal structure being characterized by a dense continuum of crystals, the said walls and interconnecting materal being constituted by a crystalline refractory selected from the group consisting of alpha alumina, compounds and solid solutions of alumina and at least one other metal oxide, and solid solutions of at least one metal oxide in said compounds of alumina and said skeletal structure containing at least about 30% by weight of alumina, and (2) a siliceous constituent in an amount of up to about 50% by weight, calculated as $SiO_2$, selected from the class consisting of elemental silicon, silicon dioxide, and metal silicates, part of which may be present in the skeletal structure.

2. A process of producing a novel refractory body comprising intimately mixing particles selected from the group consisting of aluminum, and alloys thereof in which the aluminum constitutes the predominant component with at least about 0.02% by weight based on said particles of a metal oxide fluxing agent from the class consisting of the alkali metals, alkaline earth metals, vanadium, chromium, molybdenum, tungsten, cooper, silver, zinc, antimony, and bismuth oxides, precursors of said oxides yielding the indicated amount of fluxing agent and alkali metal hydroxides and from about zero to 8 parts by weight of a particulate filler refractory per part of aluminum, and the said metal particles having one dimension of between about 0.5 and 200 mils and a second and third dimension of at least about 0.5 and 7 mils, respectively, and being present in an amount of at least about 11% by weight based on the mixture, exclusive of volatile material, shaping the mixture and adjusting the same to yield a porosity of at least 20% after removal of volatile materials, and thereafter oxidizing the metal in the mixture at a temperature of at least about 600° C. for a period of time sufficient to convert at least 11% by weight of aluminum based on the mixture, exclusive of volatiles, to the oxide, the oxidation being carried out at such a rate that the temperature of the aggregate does not exceed the ambient temperature by more than 200° C.

3. The process of claim 2 wherein the oxidation is carried out at such a rate that the temperature of the shaped mixture does not exceed the ambient temperature by more than 100° C.

4. The process of claim 2 wherein the metal oxide fluxing agent is employed in an amount up to 20% by weight based on the metal particles.

5. The process of claim 4 wherein the metal oxide fluxing agent is an alkali metal oxide.

6. A refractory body having a total porosity between about 15% and 95% and having a substantially continuous integral skeletal structure made up of interconnected walls which define closed cells, the walls and interconnecting material being composed of a dense continuum of crystals of a refractory material selected from the group consisting of alpha-alumina, compounds and solid solutions of alumina and at least one other metal oxide and solid solutions of at least one metal oxide in said compounds of alumina, said crystals having an average diameter of less than about 8 microns and exhibiting a density function of at least 0.5, the walls surrounding the closed cells of the skeletal structure having a thickness between about 0.3 mil and the diameter of the respective enclosed cell, and the closed cells in the skeletal structure exclusive of micropores having an average diameter, when measured in a plane cut through the body, between about ½ and 200 mils, the skeletal structure containing at least about 30% by weight of alumina and the alumina in the skeletal structure constituting at least about 19% by weight of the total weight of the body; said refractory body also containing from 0 to 81% by weight filler refractory and from 0 to 81% by weight of a metal selected from the group consisting of aluminum and alloys of aluminum in which the aluminum is the predominant constituent.

7. The product of claim 6 wherein the skeletal structure consists essentially of alpha-alumina.

8. The product of claim 6 wherein the skeletal structure is ordered.

9. The product of claim 6 wherein the skeletal structure appears in a repeating pattern.

10. A refractory body having a total porosity between 15 and 95%, said body consisting essentially of (1) a continuous integral skeletal structure having the shape of a honeycomb, said skeletal structure consisting of interconnected walls which define closed cells, the wall material being composed of a crystalline refractory material selected from the group consisting of alpha-alumina, compounds and solid solutions of alumina and at least one other metal oxide and solid solutions of at least one metal oxide in said compounds of alumina, the points of contact between adjacent walls constituting a dense continuum of the crystalline material of each, said closed cells extending substantially the entire length and width of the walls and having a thickness between about 0.5 and 200 mils, the skeletal structure containing at least about 30% by weight of alumina, and (2) 0–81% by weight of a metal selected from the group consisting of aluminum and alloys of aluminum in which aluminum is the predominant constituent.

11. A process for producing a refractory body in the form of a honeycomb as defined in claim 10, said process comprising the steps: (1) providing a honeycomb structure composed of a member of the group consisting of aluminum and alloys of aluminum in which aluminum is the predominant constituent, the walls of said honeycomb structure being between about 0.5 and 200 mils thick, said structure being coated with at least about 0.02% by weight based on the weight of the aluminum of a fluxing agent selected from the group consisting of alkali metal oxides and hydroxides, alkaline earth metal oxides and the oxides of vanadium, chromium, molybdenum, tungsten, copper, silver, zinc, antimony, and bismuth and precursors of said oxides yielding the indicated amount of fluxing agent, then (2) oxidizing the aluminum in the honeycomb by firing in an oxygen containing atmosphere at a temperature of at least about 600° C. for a period of time sufficient to convert at least 11% by weight of aluminum based on the total weight of the coated honeycomb exclusive of volatiles to the oxide, the oxidation being carried out at such a rate that the temperature of the honeycomb structure does not exceed the ambient temperature by more than 200° C.

12. A process as defined in claim 5 in which the fluxing agent is sodium oxide derived from sodium silicate.

13. A refractory body consisting essentially of (1) a wall of a crystalline refractory material surrounding a void, the wall having a thickness between 0.3 mil and the diameter of the enclosed void and the diameter of the enclosed void being between 0.5 and 200 mils, the crystalline refractory material being selected from the group consisting of alpha-alumina, compounds and solid solutions of alumina and at least one other metal oxide and solid solutions of at least one metal oxide in said compounds of alumina, the amount of alumina in said crystalline refractory being at least about 30% by weight, the crystals in said wall exhibiting a density function of at least 0.5 and a grain size of less than about 8 microns, and (2) from 0 to 81% by weight based on the total weight of the body, of a metal selected from the group consisting of aluminum and alloys of aluminum in which aluminum is the predominant constituent.

References Cited by the Examiner

UNITED STATES PATENTS

| | | | |
|---|---|---|---|
| 2,080,647 | 5/1937 | Wiegand | 106—286 |
| 2,517,223 | 8/1950 | Mantell | 75—222 |
| 2,741,822 | 4/1956 | Udy | 106—58 |
| 2,917,394 | 12/1959 | Schurecht | 106—65 |
| 2,942,991 | 6/1960 | Smith | 106—65 |
| 2,947,056 | 8/1960 | Csordas et al. | 106—65 |
| 3,022,685 | 2/1962 | Armacost | 106—65 |

TOBIAS E. LEVOW, *Primary Examiner.*